(12) United States Patent
Drange (10) Patent No.: US 11,105,941 B2
(45) Date of Patent: Aug. 31, 2021

(54) MANAGING MOVEMENT OF DATA PACKETS ALONG A GEOPHYSICAL SENSOR CABLE

(71) Applicant: PGS Geophysical AS, Oslo (NO)

(72) Inventor: Geir Andre Motzfeldt Drange, Oslo (NO)

(73) Assignee: PGS Geophysical AS, Oslo (NO)

( * ) Notice: Subject to any disclaimer, the term of this patent is extended or adjusted under 35 U.S.C. 154(b) by 498 days.

(21) Appl. No.: 16/101,856

(22) Filed: Aug. 13, 2018

(65) Prior Publication Data

US 2019/0049608 A1 Feb. 14, 2019

Related U.S. Application Data

(60) Provisional application No. 62/545,170, filed on Aug. 14, 2017.

(51) Int. Cl.
*G01V 1/22* (2006.01)
*G01V 1/38* (2006.01)

(52) U.S. Cl.
CPC .............. *G01V 1/22* (2013.01); *G01V 1/3808* (2013.01)

(58) Field of Classification Search
CPC ................................ G01V 1/3808; G01V 1/22
USPC .......................................................... 367/20
See application file for complete search history.

(56) References Cited

U.S. PATENT DOCUMENTS

| | | | |
|---|---|---|---|
| 4,319,347 A | 3/1982 | Savit | |
| 4,635,237 A | 1/1987 | Benestad et al. | |
| 4,967,400 A | * 10/1990 | Woods | G01V 1/22 367/21 |
| 5,859,959 A | 1/1999 | Kimball et al. | |
| 6,202,169 B1 | 3/2001 | Razzaghe-Ashrafi et al. | |
| 7,269,135 B2 | 9/2007 | Frick et al. | |

(Continued)

FOREIGN PATENT DOCUMENTS

| | | |
|---|---|---|
| EP | 0372908 A2 | 6/1990 |
| EP | 2447737 B1 | 5/2013 |
| WO | 0029717 A2 | 5/2000 |

OTHER PUBLICATIONS

"Understanding Rapid Spanning Tree Protocol (802.1w);" https://www.cisco.com/c/en/us/support/docs/lan-switching/spaning-tree-protocol/24062-146.html; Cisco Document ID: 24062;Updated Aug. 1, 2017; 16 pages.

(Continued)

*Primary Examiner* — Daniel L Murphy (57) ABSTRACT

Managing movement of data packets along a geophysical sensor cable. At least some embodiments include a geophysical sensor cable section having an internal volume within which geophysical sensors are disposed at spaced apart locations. A digitizer is disposed within the internal volume and is communicatively coupled to sensors. A telemetry unit within the internal volume is communicatively coupled to the digitizer. The telemetry unit may comprise multiple forward ports, multiple aft ports and a controller communicatively coupled to the forward ports, the aft ports, and the digitizer. The controller may be configured to: relay downstream-directed packets received on an active forward port through all aft ports; gather sensor data from the digitizer and send the sensor data as upstream-directed packets through the active forward port; and relay any upstream-directed packets received on aft ports through the active forward port.

29 Claims, 7 Drawing Sheets

(56) References Cited

U.S. PATENT DOCUMENTS

| | | | |
|---|---|---|---|
| 8,077,542 B2 | 12/2011 | Gulbransen et al. | |
| 8,625,388 B2* | 1/2014 | Pettersen | G01V 1/16 |
| | | | 367/20 |
| 9,459,944 B2 | 10/2016 | Hillesund et al. | |
| 2007/0064528 A1* | 3/2007 | Metzbower | G01V 1/201 |
| | | | 367/20 |
| 2008/0310298 A1 | 12/2008 | Drange | |
| 2009/0140879 A1 | 6/2009 | Kamata et al. | |
| 2010/0157728 A1 | 6/2010 | Gulbransen | |
| 2012/0081994 A1 | 4/2012 | Husom et al. | |
| 2015/0121124 A1* | 4/2015 | Hillesund | G01V 3/17 |
| | | | 714/5.1 |
| 2016/0170058 A1* | 6/2016 | Hampson | G01V 1/364 |
| | | | 702/191 |

OTHER PUBLICATIONS

"Multiway switching," Wikipedia, 2012, downloaded Jan. 23, 2016 from https://en.wikipedia.org/w/index.php?title=Multiway_switching&oldid=519020216, 5 pp.

European Extended Search Report dated Mar. 18, 2015, in the prosecution of patent application No. 14189723.1, 7 pages.

\* cited by examiner

MANAGING MOVEMENT OF DATA PACKETS ALONG A GEOPHYSICAL SENSOR CABLE

CROSS-REFERENCE TO RELATED APPLICATIONS

This application claims the benefit of U.S. Provisional Application Ser. No. 62/545,170 filed Aug. 14, 2017 and titled "Method for Autonomous Network Redundancy," which is hereby incorporated by reference as if reproduced in full below.

BACKGROUND

This disclosure relates to the field of marine geophysical surveying. Marine geophysical surveying can include seismic and/or electromagnetic surveying with the use of geophysical sensor cables. A marine geophysical survey cable may comprise many sensors, digitizing units, and telemetry units. When one of these units fails during operation, replacing the failed unit (if even possible), may result in operational downtime. Thus, systems and methods that mitigate downtime arising from replacement of faulty devices in the geophysical sensor cable would be desirable.

BRIEF DESCRIPTION OF THE DRAWINGS

For a detailed description of example embodiments, reference will now be made to the accompanying drawings in which.

DEFINITIONS

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Cable" shall mean a flexible, axial load carrying member that also comprises electrical conductors and/or optical conductors for carrying electrical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

"Aft ports" of a telemetry unit shall mean ports out of which packet-based messages are sent such that the packet-based messages propagate aft or toward the trailing end of a geophysical sensor streamer or ocean bottom cable. An "aft port" may also receive packet-based messages propagating forward toward a tow vessel or, in the case of an ocean bottom cable, toward a head end of the cable. The fact that a communication channel (e.g., an optical fiber or set of wires) coupled to an aft port may physically extend forward and then extend aft, shall not divest an aft port of its status as an "aft port."

"Forward ports" of a telemetry unit shall mean ports out of which packet-based messages are sent such that the packet-based messages propagate forward along a geophysical sensor streamer toward a tow vessel or, in the case of an ocean bottom cable, toward a head end of the cable. A "forward port" may also receive packet-based message propagating aft or toward the trailing end of a geophysical sensor streamer or ocean bottom cable. The fact that a communication channel (e.g., an optical fiber or set of wires) coupled to a forward port may physically extend aft and then extend forward shall not divest a forward port of its status as a "forward port."

"Controller" shall mean one or more circuits or devices of any kind, such as a field programmable gate array (FPGA), application specific integrated circuit (ASIC), programmable logic device (PLD), programmable logic controller (PLC), microcontroller with controlling software or firmware, specifically implemented processor-based system, or combinations thereof, that is or are configured to control the functioning of a system or its components.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various example embodiments are directed to geophysical sensor cables that include telemetry units that implement communication of sensor data along the geophysical sensor cable to computer systems located elsewhere, such as in the tow vessel or in a head end control system associated with an ocean bottom cable. More particularly, example embodiments are directed to methods and related systems of managing movement of packet-based messages along a geophysical sensor cable that implements redundant connections between telemetry units. The specification first turns to an example marine survey system.

Figure 1:
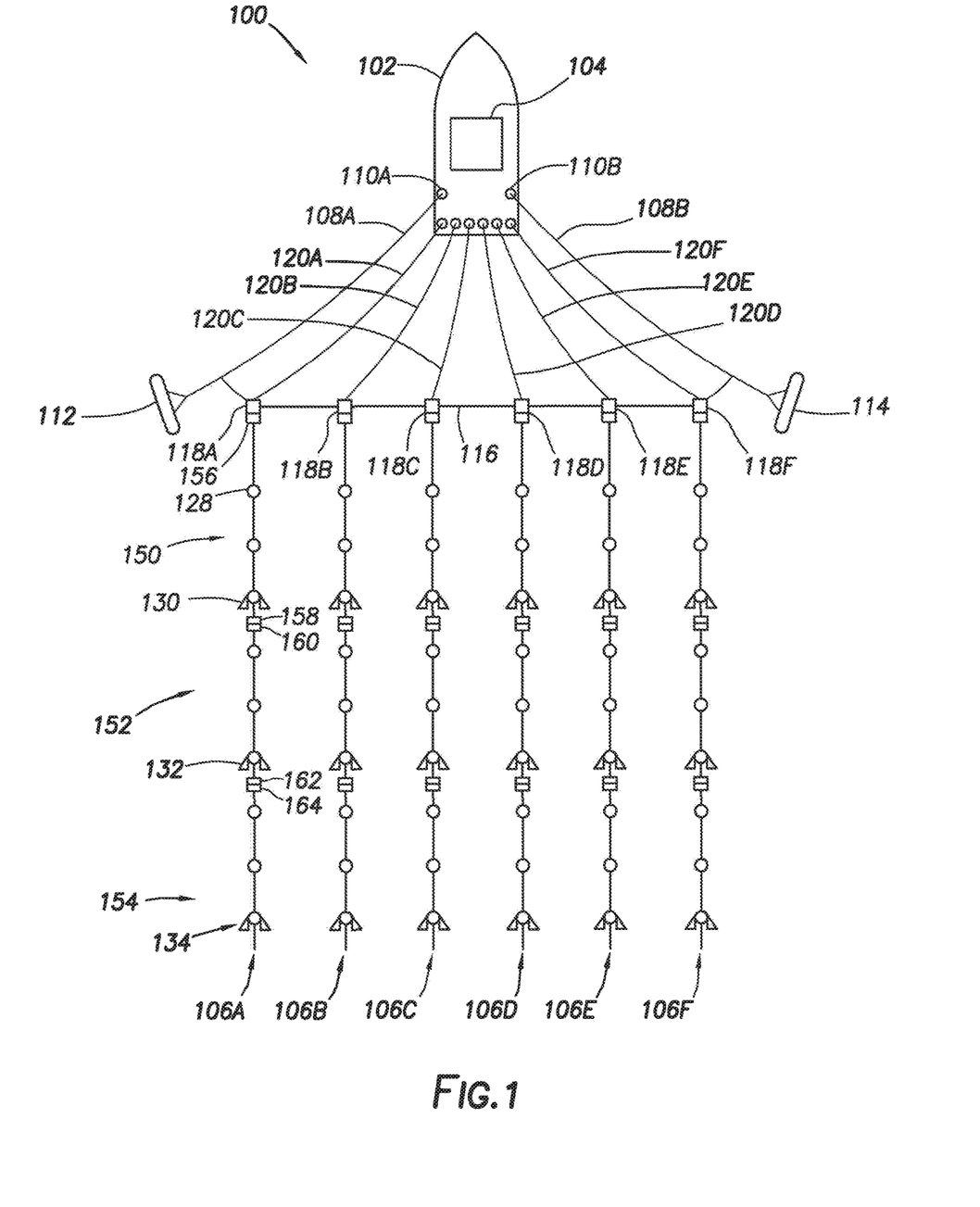
FIG. 1 shows an overhead view of a marine survey system in accordance with at least some embodiments.

FIG. 1 shows an overhead view of a marine survey system 100 in accordance with at least some embodiments. In particular, FIG. 1 shows a survey or tow vessel 102 having onboard equipment, herein referred to collectively as recording system 104, such as navigation, energy source control, and a data acquisition system. Tow vessel 102 is configured to tow one or more geophysical sensor cables through the water. Because the geophysical sensor cables are towed, the cables may be referred to as geophysical sensor streamers 106A-F. While FIG. 1 illustratively shows six geophysical sensor streamers, any number of sensor streamers may be used.

The geophysical sensor streamers 106A-F are coupled to towing equipment that maintains the geophysical sensor streamers 106A-F at selected lateral positions with respect to each other and with respect to the tow vessel 102. The towing equipment may comprise two paravane tow lines 108A and 108B each coupled to the tow vessel 102 by way of winches 110A and 110B, respectively. The second end of paravane tow line 108A is coupled to a paravane 112, and the second end of paravane tow line 108B is coupled to paravane 114. The paravanes 112 and 114 are configured to provide a lateral force component to the various elements of the survey system when the paravanes are towed in the water. The combined lateral forces of the paravanes 112 and 114 separate the paravanes from each other until the paravanes put one or more spreader lines 116, coupled between the paravanes 112 and 114, into tension.

The geophysical sensor streamers 106A-F are each coupled, at the ends nearest the tow vessel 102 (i.e., the "proximal" or "forward" ends) to a respective lead-in cable termination 118A-F. The lead-in cable terminations 118A-F are coupled to or associated with the spreader lines 116 so as to control the lateral positions of the geophysical sensor streamers 106A-F with respect to each other and with respect to the tow vessel 102. Electrical and/or optical connections between the appropriate components in the recording system 104 and the sensors in the geophysical streamers 106A-F (e.g., sensor 128 in geophysical sensor streamer 106A) may be made using lead-in cables 120A-F, respectively.

In order to control depth of the geophysical sensor streamers, and in some cases to control lateral spacing between the geophysical sensor streamers, the geophysical sensor streamers may be associated with a plurality of streamer positioning devices periodically spaced along the geophysical sensor streamers. Again referring to geophysical sensor streamer 106A as representative, a positioning device 130 may be coupled near the proximal end of geophysical sensor streamer 106A. In some cases, the positioning device 130 may provide only depth control, as the lateral spacing of the geophysical sensor streamer near the proximal end may be adequately controlled by the spreader line 116. Further, representative geophysical sensor streamer 106A may be associated with positioning devices 132 and 134, shown coupled further from the proximal ends. The positioning devices 132 and 134 may provide depth control, and/or lateral positional control. While FIG. 1 shows only three positioning devices 130, 132, and 134 associated with representative geophysical sensor streamer 106A, in practice each geophysical sensor streamer may be from a few thousand meters to 10 kilometers or more in length, and have many positioning devices periodically spaced along the entire length of the geophysical sensor streamer (e.g., every 20-30 meters).

Each geophysical sensor streamer 106A-F may comprise a plurality of geophysical sensor cable sections (hereafter just "sensor cable sections") coupled end-to-end to create the overall geophysical sensor streamer 106A-F. For example, and again referring to geophysical sensor streamer 106A as representative, the geophysical sensor streamer 106A may comprise a plurality of sensor cable sections 150, 152, and 154. While only three sensor cables are shown so as not to unduly complicate the figure, again in practice each geophysical sensor streamer may be a few thousand meters to 10 kilometers or more in length, and each sensor cable section (e.g., sensor cable sections 150, 152, and 154) may be about 75 to 100 meters in length. Thus, an overall geophysical sensor streamer may be made up of one hundred or more individual sensor cable sections.

Still referring to geophysical sensor streamer 106A as representative, the proximal-most sensor cable section 150 comprises a coupler 156 that couples to the lead-in cable 120A and spreader line 116. Opposite the coupler 156, sensor cable section 150 comprises a second coupler 158. Sensor cable section 152 comprises a coupler 160 at the proximal end that couples to coupler 158 of sensor cable section 150, and sensor cable section 152 comprises a second coupler 162 at a distal end of the sensor cable section 152. Sensor cable section 154 comprises a coupler 164 at the proximal end that couples to coupler 162 of sensor cable section 152, and sensor cable section 154 comprises a second coupler (not specifically shown) at a distal end of the second cable section 152, and so on. Thus, the representative geophysical sensor streamer 106A is constructed from a plurality of individual sensor cable sections (e.g., 150, 152, and 154), each of which may be about 100 meters in length.

The marine survey system of FIG. 1 is a towed system; however, in other cases the sensor cable sections may be coupled together as discussed with respect to geophysical sensor streamers, but instead used as ocean-bottom cables that remain stationary during the geophysical survey. In cases where the geophysical sensor cables are stationary, the seismic source may be towed by the tow vessel above the geophysical sensor cables. The discussion below is thus equally applicable to towed systems (i.e., geophysical sensor streamers) as well as ocean-bottom sensor cables. The discussion now turns to an example sensor cable section.

Figure 2:
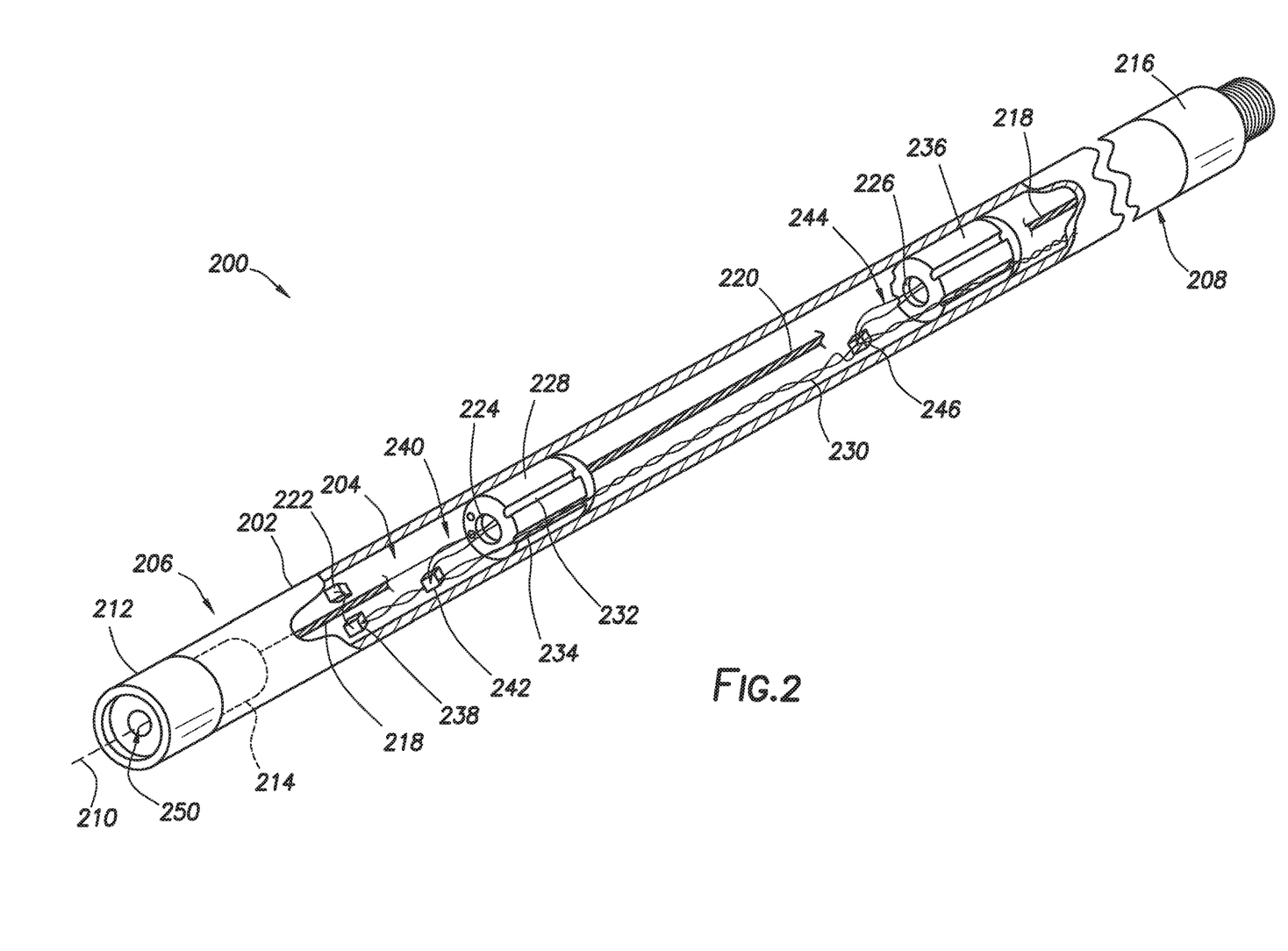
FIG. 2 shows a perspective, partial cut away, view of a geophysical sensor cable section in accordance with example embodiments.

FIG. 2 shows a perspective, partial cut away, view of a sensor cable section 200 in accordance with example embodiments. Sensor cable section 200 could be any of the sensor cable sections 150, 152, or 154 discussed with respect to FIG. 1. In particular, example sensor cable section 200 comprises an outer jacket 202 that defines an internal volume 204 and a central axis 210. Sensor cable section 200 may be filled with any suitable fluid or gel material, or may be substantially solid. Sensor cable section 200 further includes a first end 206 and a second end 208 opposite the first end 206 along central axis 210. A coupler 212, which could be any of the previously mentioned couplers, resides at the first end 206. The coupler 212 may define a reduced diameter portion 214, and the first end 206 of the outer jacket 202 telescopes over and seals against the reduced diameter portion 214. Jacket 202 defines a surface that surrounds an interior volume 204. The coupler 212 is configured to mechanically and communicatively couple to a mating coupler of a forward or upstream geophysical sensor cable section. Likewise, the example sensor cable 200 comprises a second coupler 216 at the second end 208 opposite the first end 206. Coupler 216 is configured to mechanically and communicatively couple to a mating coupler of an aft or a downstream geophysical sensor cable section. The coupler 216 may also define a reduced diameter portion over which the second end 208 of the outer jacket 202 telescopes and against which the outer jacket 202 seals, but the reduced diameter portion of coupler 216 is not shown so as not to further complicate the figure.

In the example sensor cable section 200, tension associated with towing forces (or forces associated with deploying and retrieving the cable in an ocean-bottom context) may be carried by strength members in the form of ropes mechanically coupled between the couplers such that the outer jacket 202 carries little (if any) of the towing force. The ropes are disposed within the internal volume 204 of the outer jacket 202. In particular, example sensor cable 200 comprises two strength members 218 and 220, both of which run the length of the sensor cable 200 and mechanically couple to the couplers 212 and 216. In order not to obscure other aspects of the sensor cable section to be explained below, portions of the strength members 218 and 220 are removed from the drawing of FIG. 2. Nevertheless, strength member 218 would be the closest in the view of FIG. 2 and runs between the coupler 212, through the channel 232 of the sensor holder 228, through the channel (unnumbered) of sensor holder 236, and then to coupler 216. Strength member 220 would be "deeper" in the sensor cable in the view of FIG. 2, and runs between the coupler 212, through a channel on the back side of sensor holder 228, through a channel on the back side of sensor holder 236, and then to coupler 216. While FIG. 2 shows two strength members 218 and 220, one or more strength members may be used.

The example sensor cable section 200 further comprises a plurality of geophysical sensors at spaced apart locations along the central axis 210 within the internal volume 204 of the outer jacket 202. In the example sensor cable section 200 of FIG. 2, the geophysical sensors are shown as seismic sensors 224 and 226 (e.g., hydrophones and/or geophones). However, in other cases the geophysical sensors may take any suitable form, such as electrodes or antennas for receiving signals during an electromagnetic survey. The two example seismic sensors 224 and 226 are shown (partially), but in practice each sensor cable section 200 may have one hundred or more geophysical sensors depending on the spacing of the geophysical sensors and the length of the sensor cable section 200. Example seismic sensor 224 is disposed within sensor holder 228 that holds the seismic sensor 224 at a particular axial location within the internal volume 204 along the central axis 210. The example sensor holder 228 holds the seismic sensor 224 centered in the internal volume 204. Holding the example seismic sensor 224 centered in the internal volume 204 is not required, and other off-center placements, as well as holding the example seismic sensor 224 in a gimballed arrangement, are also contemplated. The example sensor holder 228 defines an exterior surface that is largely circular and thus abuts at least some of the inside diameter of the outer jacket 202. The sensor holder 228 comprises various apertures in order to accommodate the various strength members, communication channels, and twisted pair 230 electrical conductors contained within the sensor cable section. The apertures may include channels accessible through the exterior surface. For example, channel 232 may provide space for the strength member 218 (removed from the drawing at the location of the sensor holder 228 so as not to obscure other components) to extend past the sensor holder 228. A similar channel (not specifically numbered) exists on the opposite side of the sensor holder 228 for strength member 220. Finally, the example sensor holder 228 may comprise a channel 234 through which the twisted pair 230 may extend. Example seismic sensor 226 is also shown to be disposed within sensor holder 236, and sensor holder 236 has similar channels as those discussed with respect to the sensor holder 228.

Still referring to FIG. 2, the example sensor cable section 200 includes a twisted pair 230 that extends at least partially through the internal volume 204 of the outer jacket 202. In example systems, the seismic sensors may be coupled in sensor groups (e.g., the seismic sensors coupled in parallel), and twisted pair 230 may thus electrically couple the seismic sensors of one sensor group to a digitizer 238 disposed within the internal volume 204 of the outer jacket 202. The digitizer 238, in turn, communicatively couples to a telemetry unit 222 disposed within the internal volume 204. While FIG. 2 shows only one twisted pair 230, each sensor group may comprise its own twisted pair coupled to digitizer 238, or multiple digitizers may reside within the internal volume, each digitizer communicatively coupled to the telemetry unit 222. The example seismic sensors 224 and 226 each electrically couple to the twisted pair 230 by way of electrical leads. Referring first to seismic sensor 224, seismic sensor 224 defines two electrical leads 240 that electrically couple to the twisted pair 230 at location 242. Likewise, seismic sensor 226 defines two electrical leads 244 that electrically couple to the twisted pair 230 at location 246.

Note that, in other embodiments, alternative materials may be used as communication channels in addition to or in lieu of twisted pair 230. For example, communication channels may be implemented by sets of wires or electrical conductors that are not disposed in a twisted pair arrangement, or by optical fibers. References in this disclosure to twisted pair 230 are not intended to exclude use of such other varieties of communication channels in other embodiments.

As discussed in greater detail below, the telemetry module 222 communicatively couples to two or more upstream telemetry modules (e.g., in upstream or forward sensor cable sections), and also communicatively couples to two or more downstream telemetry modules (e.g., in downstream or aft sensor cable sections).

In example systems, each sensor group may span between and including three meters and six meters of the overall length (measured parallel to the central axis 210) of the sensor cable section 200 depending upon the target depth of a formation of interest for which the sensor cable section 200 will be used. For example, a sensor cable section having a one hundred meter length may have between 16 sensor groups (for 6 meter span sensor groups) and 33 sensor groups (for 3 meter span sensor groups), inclusive. Within a sensor group, the example seismic sensors may be spaced between and including 60 and 80 centimeters (cm). Thus, the example sensor cable section 200 of the FIG. 2 shows only a portion of one sensor group, but the sensor cable section may have many more sensor groups, and thus many more sensors.

Still referring to FIG. 2, the first coupler 212 has a communication connector 250 exposed therein. The communication connector 250 has connections (not specifically numbered) communicatively coupled to the telemetry unit 222, and also communicatively coupled to connections of a corresponding communication connector in the second coupler 216 (the communication connector in the second coupler 216 not visible in the view of FIG. 2). The connections of the communication connector 250, as well as the connections of the communication connector of coupler 216, may include electrical connectors (e.g., power connectors, communicative connectors such as Ethernet connections) and optical connectors corresponding to the communication system used within the sensor cable section 200. Thus, when coupler 212 connects to an upstream sensor cable section, the coupler 212 both mechanically and communicatively couples to the upstream sensor cable section. Likewise, when coupler 216 connects to a downstream sensor cable section, the coupler 216 both mechanically and communicatively couples to the downstream sensor cable section.

Figure 3:
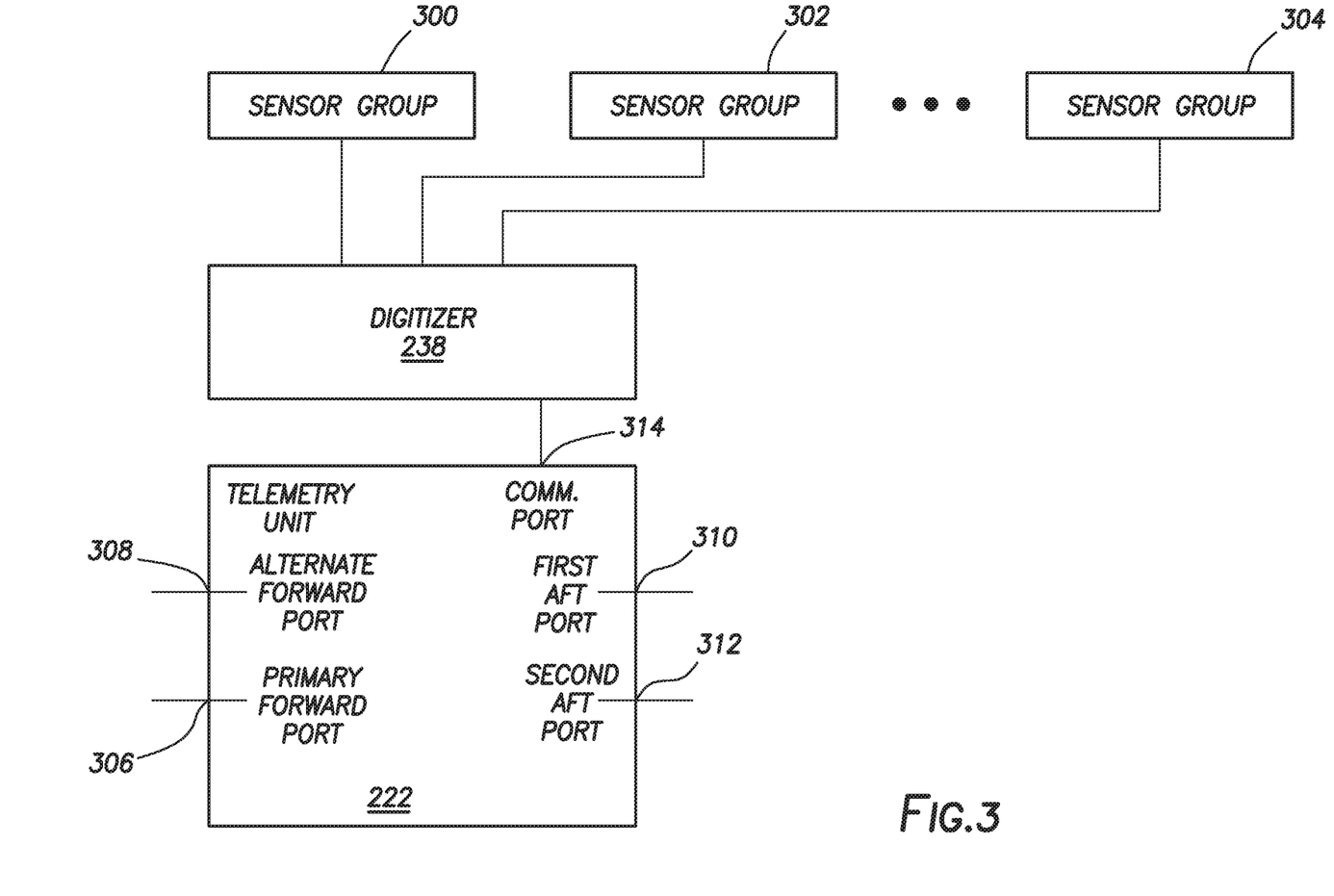
FIG. 3 shows a simplified block diagram of a telemetry unit, and associated digitizer and sensor groups, in accordance with at least some embodiments.

FIG. 3 shows a simplified block diagram of a telemetry unit and associated digitizer and sensor groups, in accordance with at least some embodiments. In particular, FIG. 3 shows a telemetry unit 222 communicatively coupled to digitizer 238. The digitizer 238 communicatively couples to a plurality of sensor groups 300, 302, and 304. For example, sensors 224 and 226 (FIG. 2) may be members of the sensor group 300. In some cases, each sensor cable section 200 comprises one telemetry unit 222, one digitizer 238, and a plurality of sensors arranged in sensor groups. In other cases a sensor cable section 200 may comprise a single telemetry unit 222 communicatively coupled to multiple digitizers, with each digitizer coupled to two or more sensor groups. In still other cases, a sensor cable section 200 may have multiple telemetry units, each telemetry unit coupled to at least one digitizer, and each digitizer coupled to at least one sensor group.

The example telemetry unit 222 defines a plurality of communication ports. The communication ports are conceptually divided into forward ports and aft ports. In particular, the example telemetry unit 222 defines a primary forward port 306 and an alternate forward port 308. The primary forward port 306 is designated as primary because in operation the example telemetry unit 222 uses the primary forward port 306 to send data packets to upstream telemetry units (or in the case of the forward-most telemetry unit, to the recording system on the tow vessel) unless and until communication fails along the primary forward port 306. When communication fails on the primary forward port 306 (detecting communication failure is discussed in greater detail below), the example telemetry unit then uses the alternate forward port 308 to send data packets to upstream telemetry units (or in the case of the forward-most telemetry unit, to the recording system on the tow vessel or associated with the head end of an ocean bottom cable).

Still referring to FIG. 3, the example telemetry unit 222 further comprises a plurality of aft ports. In particular, the example telemetry unit 222 defines a first aft port 310 and a second aft port 312. The example telemetry unit 222 further comprises a communication port 314 communicatively coupled to the digitizer 238. The digitizer 238 reads geophysical data from its connected sensor groups and, in example embodiments, creates sensor data packets based on the geophysical data of the sensor groups. The telemetry unit 222 receives sensor data packets containing geophysical data from the sensor groups by way of the digitizer 238 through communication port 314. In other embodiments, telemetry unit 222 may receive sensor data from digitizer 238 by means other than via data packets. The telemetry unit 222 may also perform command and control operations regarding the digitizer 238 over the communication port 314.

In accordance with example embodiments, the telemetry unit 222 is configured to perform at least three high-level tasks. First, the telemetry unit 222 is configured to relay downstream-directed packets received on either the primary forward port or the alternate forward port (whichever is the active or operational port) to all aft ports. The downstream-directed packets originate at a computer system of the tow vessel or at a head end of an ocean bottom cable, and may be used in some instances by the telemetry units to sense whether forward communication paths are operational. Telemetry units may also use downstream-directed packets for control and clock synchronization purposes. The second high-level task of the example telemetry unit 222 is to gather geophysical data from the digitizer 238, such as over the communication port 314, and to send sensor data packets along a single forward port (e.g., either the primary forward port, or the alternate forward port, depending on which forward port is operational). The third high-level task is to forward any upstream-directed packets received on the first and second aft ports along a single forward port (e.g., either the primary forward port, or the alternate forward port, depending on which forward port is operational).

Before continuing the description with respect to multiple telemetry units, and how movement of data packets is controlled by the telemetry units, a few points are in order. First, the telemetry units are disposed within the internal volumes of their respective sensor cable sections. It follows that the telemetry units are limited in size to fit within the internal volume taking into account the other components within the internal volume (e.g., strength members). Moreover, being disposed within respective sensor cable sections, in operation the telemetry units are submerged below the surface of the body of water in which the geophysical survey is taking place. The computational power that each telemetry unit can implement may be limited by the size constraints, as well as by the available power constraints along the geophysical sensor streamer (which are made up of multiple series-connected sensor cable sections). Because of the noted limitations, in related-art systems, redundancy of communication to and from devices within the geophysical sensor streamer was implemented by computer systems on the tow vessel, where size and power constraints, and thus computational power, was not an issue. That is, in the related art, decisions about how to route or re-route communications to bypass portions or sections with broken communication channels are made by the computer systems aboard the tow vessel. In the various embodiments of the present disclosure, by contrast, the implementation of redundancy of communication, and more particularly movement of data packets to bypass broken communication channels, is implemented by and within each telemetry unit.

In example embodiments, each telemetry unit is only aware of directly connected upstream telemetry units (e.g., its nearest-neighbor upstream telemetry units, and in some cases two upstream nearest neighbors), and is only aware of directly connected downstream telemetry units (e.g., its nearest-neighbor downstream telemetry units, and in some cases two downstream nearest neighbors). This unique communications architecture within each streamer sensor section dramatically reduces the complexity of routing decisions for data packets. This, in turn, enables making routing decisions at the telemetry units themselves without involvement of the computer system on the tow vessel. Thus, communication issues can be sensed earlier and corrective action taken more quickly.

Figure 4:
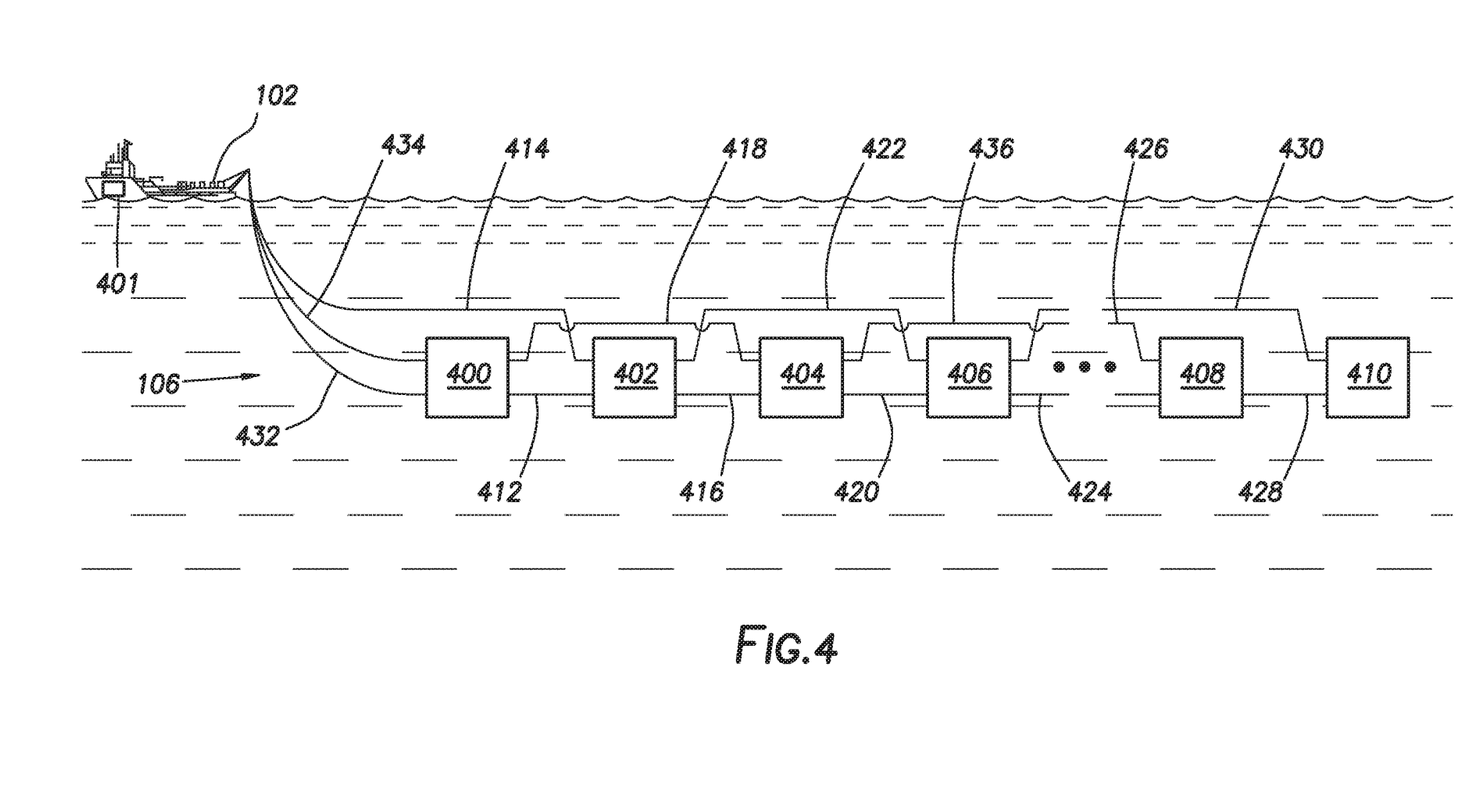
FIG. 4 shows a simplified block diagram of interconnections between telemetry units in accordance with at least some embodiments.

FIG. 4 shows a simplified block diagram of interconnections between telemetry units in accordance with at least some embodiments. In particular, FIG. 4 shows a tow vessel 102 communicatively coupled to a geophysical sensor streamer 106 illustrated by an example set of telemetry units 400, 402, 404, 406, 408, and 410. In the case of ocean-bottom cables, the computer system 401 may be on a vessel (e.g., platform, moored vessel) in the vicinity of the geophysical sensor cables, or on shore if the geophysical sensor cables are laid out close enough to shore. Example telemetry unit 222 of FIG. 3 could be any of these telemetry units. The digitizers, sensor groups, sensors, and other components of the geophysical sensor streamer 106 are not shown so as not to unduly complicate the figure. Telemetry unit 402 defines a primary forward port, an alternate forward port, and two aft ports at the same physical locations as for example telemetry unit 222 in FIG. 3. So as not to further complicate the drawing, the ports of the telemetry units in FIG. 4 are not specifically numbered. Nevertheless, the primary forward port of the telemetry unit 402 is communicatively coupled to an aft port of telemetry unit 400 by way of primary communication channel 412. The alternate forward port of telemetry unit 402 is communicatively coupled to the computer system 401 aboard the tow vessel 102 by way of secondary communication channel 414. Turning to telemetry unit 404, the primary forward port of the telemetry unit 404 is communicatively coupled to an aft port of telemetry unit 402 by way of primary communication channel 416. The alternate forward port of telemetry unit 404 is communicatively coupled to an aft port of telemetry unit 400 by way of secondary communication channel 418. Turning to telemetry unit 406, the primary forward port of the telemetry unit 406 is communicatively coupled to an aft port of telemetry unit 404 by way of primary communication channel 420. The alternate forward port of telemetry unit 406 is communicatively to an aft port of telemetry unit 402 by way of secondary communication channel 422. The pattern of interconnections between the telemetry units continues along the example geophysical sensor streamer 106.

Turning to the penultimate telemetry unit 408, the primary forward port of the telemetry unit 408 is communicatively coupled to an aft port of upstream nearest-neighbor telemetry unit (not shown) by way of primary communication channel 424. The alternate forward port of telemetry unit 408 is communicatively to an aft port of a second upstream nearest-neighbor telemetry unit (not shown) by way of secondary communication channel 426. Turning to the distal-most telemetry unit 410, the primary forward port of the telemetry unit 410 is communicatively coupled to an aft port of telemetry unit 408 by way of primary communication channel 428. The alternate forward port of telemetry unit 410 is communicatively coupled to a second upstream nearest-neighbor telemetry unit (not shown) by way of secondary communication channel 430. The aft ports of telemetry unit 410 are unconnected. Returning to telemetry unit 400, both the primary forward port and alternate forward port communicatively couple directly to the computer system 401 in the tow vessel 102 by way of primary communication channel 432 and secondary communication channel 434, respectively.

Figure 5:
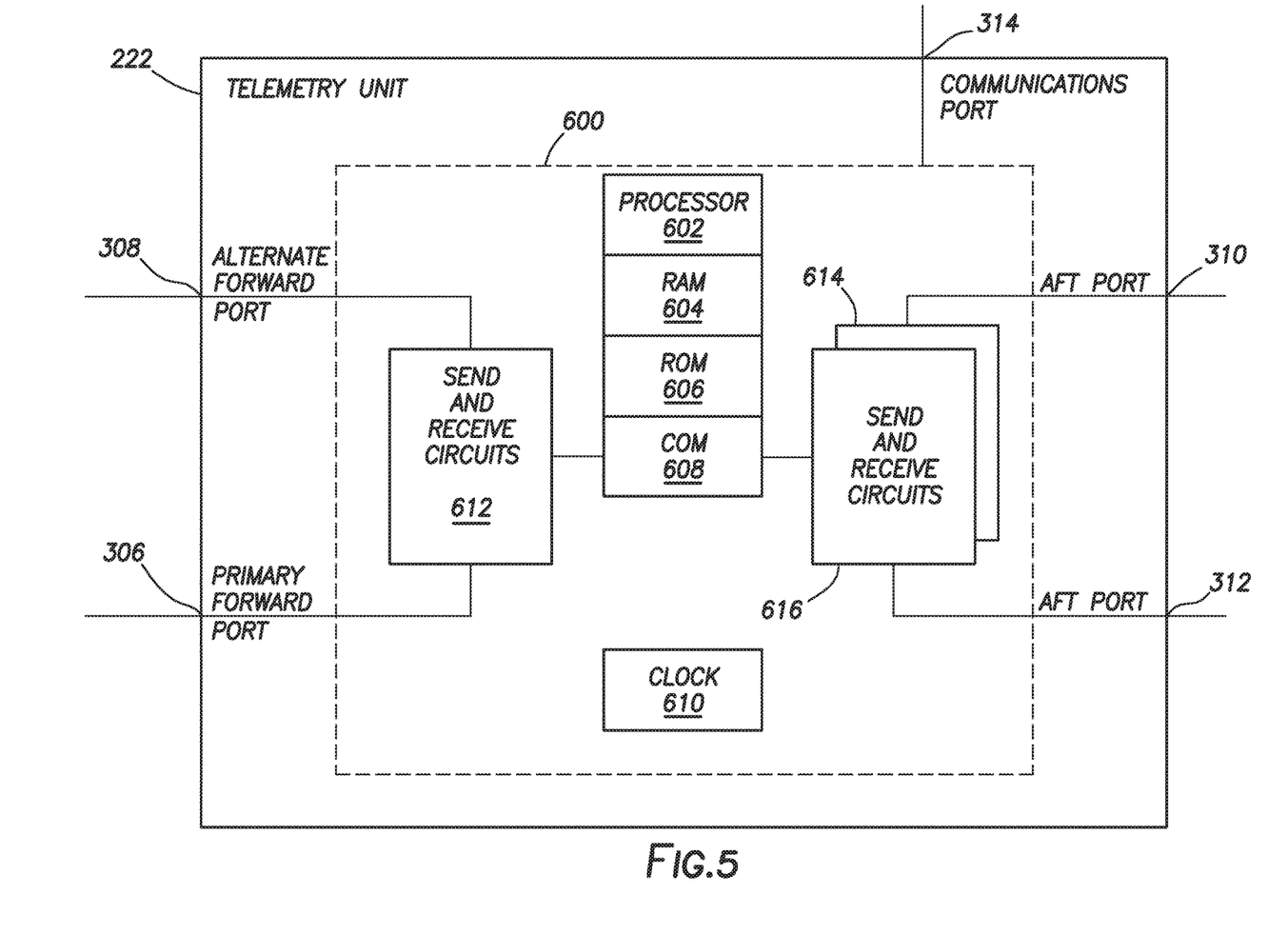
FIG. 5 shows a more detailed block diagram of an exemplary one of the telemetry units of FIG. 4 in accordance with at least some embodiments.

FIG. 5 shows a more detailed block diagram of a single telemetry unit in accordance with at least some embodiments. In particular, FIG. 5 shows telemetry unit 222, which telemetry unit is representative of any of the telemetry units 400, 402, 404, 406, 408, and 410. As discussed with respect to the FIG. 3, the example telemetry unit 222 defines a primary forward port 306 and an alternate forward port 308. Additional forward ports may be implemented. The example telemetry unit 222 further defines a first aft port 310 and a second aft port 312. Additional aft ports may be implemented. The example telemetry unit 222 further includes a communication port 314. In other embodiments, digitizer 238 may be integrated with telemetry unit 222 as a single unit.

In example embodiments, the various ports communicatively couple to a controller 600. Controller 600 may be a field programmable gate array (FPGA), an application specific integrated circuit (ASIC), a programmable logic device (PLD), a programmable logic controller (PLC), a microcontroller with controlling software, specifically implemented processor-based system, or combinations thereof configured to relay downstream-directed packets received on the forward ports 306 or 308, gather sensor data packets (by way of communication port 314), send sensor data packets along a single forward port (e.g., primary forward port 306 or alternate forward port 308), and forward sensor data packets received on any aft port along a single forward port (e.g., primary forward port 306 or alternate forward port 308).

In the example system of FIG. 5, the controller 600 is at least partially implemented by way of microcontroller having processor 602 electrically coupled to random access memory (RAM) 604, read-only memory (ROM) 606, as well as communication logic (COM) 608 sections. Communication logic 608 may, in turn, be coupled to one or more sets of send and receive circuits 612, 614, 616. Controller 600 may also include a clock 610, which it is capable of adjusting responsive to downstream-directed time synchronization packets received on the active one of the primary or secondary forward ports. Likewise, controller 600 may be capable of altering the state of itself or digitizer 238 responsive to downstream-directed control packets received on the active one of the primary or secondary forward ports. Though controller 600 is shown in the form of a microcontroller, in other cases individual components (i.e., an individual processor, RAM, ROM, etc.) may be combined to implement the functionality, or other devices such as FGPAs, ASICs, PLCs, PLDs, and discrete components may be used. The example RAM 604 may be the working memory for the processor 602. ROM 606 may store programs and data in a non-volatile fashion, and the processor 602 may copy the programs and data from the ROM 606 to RAM 604 during execution of the programs. The communication logic 608 may be used for packet-based communications with internal or external devices, and thus the communication logic may be responsible for implementing connection oriented protocols such as TCP and/or connectionless protocols such as UDP for all the various ports. In other cases, multiple communication logics may be implemented with respect to the microcontroller, or multiple microcontrollers may be present. In the example case of the controller 600 being a microcontroller as shown, the software stored on the ROM 606 and/or RAM 608, when executed by the processor 602, causes the processor to implement the telemetry unit functionality discussed herein, including: relaying downstream-directed packets received on either the primary forward port 306 or the secondary forward port 308 (whichever is active) to all aft ports (e.g., 310 and 312); gathering geophysical data from the communication port 314; creating sensor data packets from the geophysical data; sending the sensor data packets along the primary or secondary forward port (whichever is active); and relaying any upstream-directed packets received on the first and second aft ports along the primary or secondary forward port (whichever is active).

Figure 6:
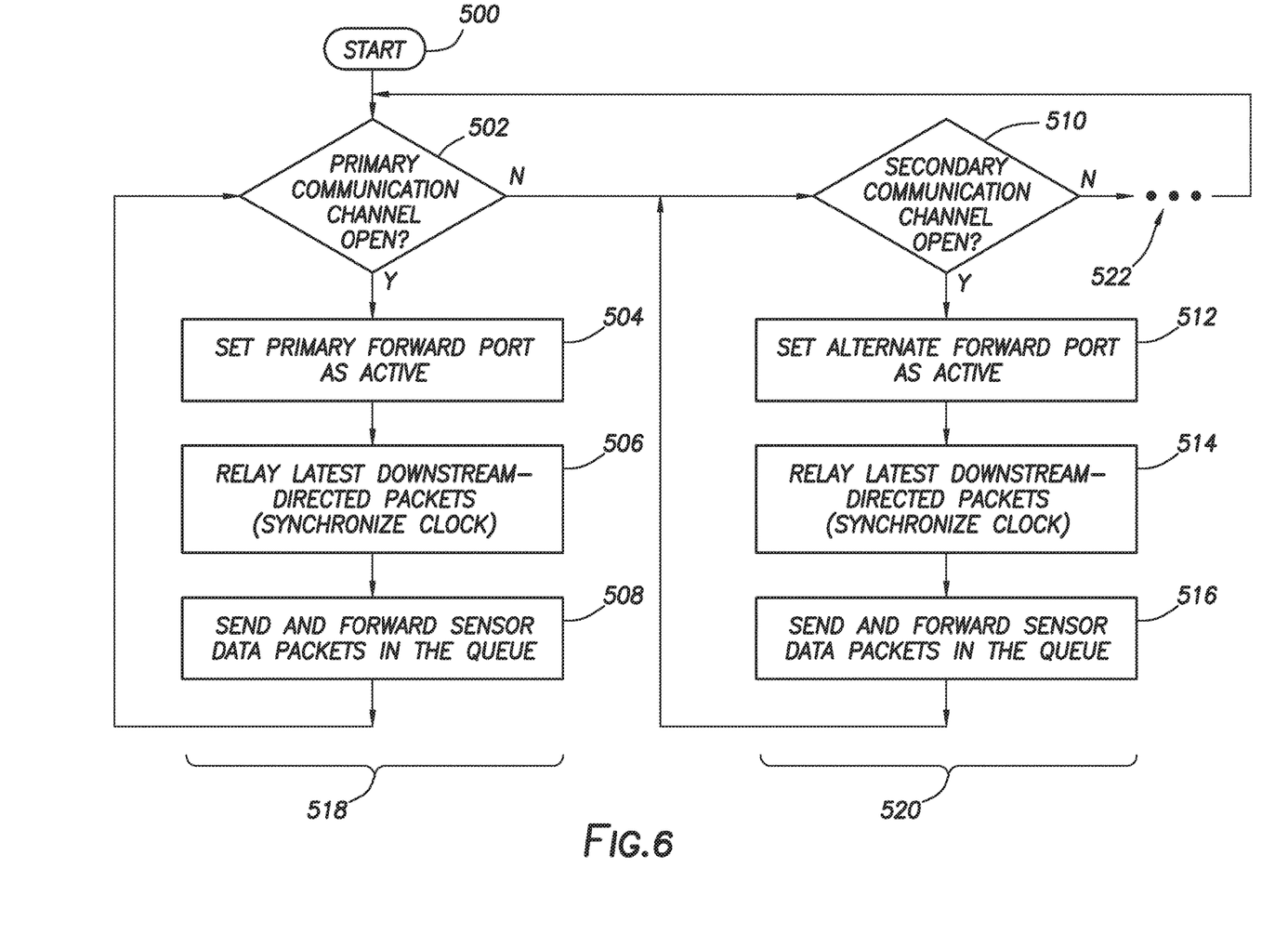
FIG. 6 shows a flow diagram of a method managing movement of data packets along a geophysical sensor cable in accordance with at least some embodiments.

FIG. 6 shows a flow diagram illustrating a method of moving data packets along a geophysical sensor cable in accordance with at least some embodiments. In particular, the method of FIG. 6 may be implemented in each telemetry unit of the system described above. The method starts (block 500) and proceeds to a determination as to whether the communication channel associated with the primary forward port is open (block 502). The determination may be made in a number of ways. In some embodiments, the telemetry may make the determination based on inspecting a queue for downstream-directed packets received on the primary forward port. If no packets are in the queue after a predetermined amount of time, the telemetry unit may conclude that the communication channel is not functioning. In other embodiments, the telemetry unit may make the determination based on a level of signal strength observed on the communication channel, of or the level of signal strength observed over time. The latter class of embodiments may be particularly useful, for example, in implementations using fiber optic links as communication channels, but may also be used with other types of communication channels such as twisted pair wires. In these embodiments, if the signal strength level is observed to be below a predetermined threshold, or perhaps is observed to be falling at a rate that exceeds a threshold rate, then the telemetry unit may conclude that the communication channel is either not functioning or that it should not be used if another communication channel is available with better signal quality. If the primary communication channel is open (again block 502), the example method proceeds to setting or designating the primary forward port as the active forward port (block 504). It may do so by any suitable means, such as by setting a flag. On second and subsequent passes through the "Y" path of the block 502, the setting as the active forward port step may be skipped if the primary forward port is already designated as the active forward port.

The example method then proceeds to relay downstream-directed packets received on the active forward port through all of the aft ports of the telemetry unit (block 506). In cases where the downstream-directed packet is a time synchronization packet, the method may further include aligning the internal clock 610 of the telemetry unit using the synchronization information (again block 506). In cases where the downstream-directed packet is a control packet that is addressed specifically for telemetry unit 222, the telemetry unit may modify control state within the telemetry unit (or in an associated digitizer unit) responsive to information contained in the control packet. In such an event, the packet need not be relayed through the aft ports to other telemetry units, since the control information was addressed to telemetry unit 222 only. In other events, the control packet may be addressed to all telemetry units. In the latter cases, telemetry unit 222 relays the control packet through both aft ports in addition to modifying its own control state responsive to information in the packet.

The illustrative method then continues with block 508, in which the telemetry unit gathers sensor data from its associated digitizer and sends the sensor data as upstream-directed packets through the active forward port. Also in block 508, the telemetry unit relays any other upstream-directed packets received on the first and second aft ports through the single active port. Thereafter, the example method returns to determining whether the primary communication channel is open (again block 502).

Assuming for purposes of explanation that, in block 502, the telemetry unit determines that the primary communication channel either is not functional or otherwise should not be used, the example method proceeds to a determination as to whether a secondary communication channel is open (block 510). The determination may be made in any suitable manner, such as the manner described above. If the secondary communication channel is open (again block 510), the example method proceeds to setting the alternate forward port associated with the secondary communication channel as the active forward port (block 512). On second and subsequent passes through the "Y" path of the block 510, the setting as the alternate forward port may be skipped if the alternate forward port is already designated as active.

The example method then proceeds with blocks 512, 514 and 516, which mirror blocks 504, 506 and 508, except that processing continues with block 510 again after completing block 516.

The example method is conceptually organized in columns, with column 518 controlling when the primary communication channel (and thus the primary forward port) is open and active, and column 520 controlling when the secondary communication channel (and thus the alternate forward port) is open and active. Though the example telemetry unit 222 (FIG. 3) shows two forward ports, additional forward ports may be implemented, and for each additional forward port an additional column in the method would be included (as indicated by the ellipsis 522). If no primary communication channel is open after cycling through all the primary communication channels, the example method retreats and starts again with respect to the primary communication channel (block 502). In other example embodiments, the control loops may be organized differently, and the blocks may be performed in any number of different orders with similar effect.

With the example interconnections and functional behaviors of the telemetry units in mind, the specification now turns to illustrate example movement of packet-based messages along the example geophysical sensor streamer 106 (or ocean bottom cable), starting with movement of downstream-directed packets from the tow vessel 102 (or ocean bottom cable head end) toward the distal-most telemetry unit 410.

Referring back to FIG. 4, in operation, the computer system 401 periodically sends downstream-directed packets to at least two telemetry units disposed in the geophysical sensor streamer 106. More particularly, the computer system 401 periodically (e.g., tens to hundreds of times per second) sends downstream-directed packets to the forward ports of all directly connected telemetry units. In the example system of FIG. 4, the computer system 401 sends the downstream-directed packets to both forward ports of telemetry unit 400, and sends the downstream-directed packets to the alternate forward port of telemetry unit 402. Each telemetry unit relays downstream-directed packets received on one of its forward ports along all aft ports. With respect to relaying downstream-directed packets, and referring initially to forward-most telemetry unit 400, telemetry unit 400 is designed and constructed to initially attempt to sense receipt of downstream-directed packets along its primary forward port. Assuming downstream-directed packets are received along the primary forward port, the telemetry unit 400 relays the downstream-directed packets along all aft ports of the first telemetry unit 400. In the example system of FIG. 4 then, the telemetry unit 400 relays the downstream-directed packets to the primary forward port of the telemetry unit 402 (along primary communication channel 412), and also relays the downstream-directed packets to the alternate forward port of telemetry unit 404 (along secondary communication channel 418).

As discussed above, the downstream-directed packets may take any suitable form. In one example embodiment, the downstream-directed packets comprise time synchronization packets containing time synchronization information (and are thus referred to as "time synchronization packets"). In other cases, downstream-directed packets may contain control commands or other information addressed to any one, or all, of the telemetry units. In the case where the downstream-directed packets are time synchronization packets (and thus contain time synchronization information), each telemetry unit also checks alignment of an internal clock 610, and aligns the clock as needed, to the time synchronization information.

Referring again to telemetry unit 400, if at any time telemetry unit 400 senses that arrival of downstream-directed packets has ceased on the primary forward port, as discussed above and indicating a failure of primary communication channel 432, responsive thereto the telemetry unit 400 attempts to sense downstream-directed packets on one or more alternate forward port(s). If the example telemetry unit senses downstream-directed packets on the alternate forward port, then the telemetry unit 400 relays the downstream-directed packets received on the alternate forward port along all aft ports. Stated in terms of communication channels, in the example of FIG. 4, if the downstream-directed packets fail to arrive across the primary communication channel 432 (or the signal strength is below a threshold or falling), the alternate forward port is internally designated as active, and downstream-directed packets received across the secondary communication channel 434 are forwarded along all the aft ports.

In example embodiments, the various forward ports and aft ports of the telemetry units may send and receive upstream-directed packets and downstream-directed packets using any suitable protocol. For example, in some embodiments, telemetry units may send and receive upstream-directed packets using a connection-oriented service, such as that provided by the Transmission Control Protocol (TCP). TCP or other connection-oriented protocols may be appropriate in this case because upstream-directed packets may contain sensor data, and therefore the greater reliability associated with connection-oriented protocols may prove advantageous to ensure that all of such packets are received on the vessel or at the head end. Conversely, in some embodiments, the ports may send and receive downstream-directed packets using a connectionless service, such as that provided by the User Datagram Protocol (UDP). For example, loss of one or more heartbeat or time-synchronization packets may be tolerated by the system, with the advantage of greater simplicity of implementation for the UDP protocol versus the TCP protocol.

In one example embodiment of a telemetry unit, each forward port has associated therewith a flag that is asserted when the forward port is the active port over which sensor data packets are being sent and forwarded. In yet still other example embodiments, the send and receive circuits 612 associated with forward ports may be implemented only once within any telemetry unit, and may be coupled selectively to one or the other forward port responsive as appropriate (e.g., responsive to the flag). Thus, a telemetry unit may initially communicatively couple (e.g., using electrical switches or relays) the send and receive circuits 612 to the primary forward port, and in the case where downstream-directed packets cease to arrive on that port for a predetermined period of time, the telemetry unit may uncouple the send and receive circuits 612 from the primary forward port and couple the send and receive circuits to an alternate forward port. Having a single set of send and receive circuits associated with the forward ports may make the size, cost, and power usable of a telemetry unit lower.

Still referring to FIG. 4, and still with respect to relaying downstream-directed packets, telemetry unit 402 is designed and constructed to initially attempt to sense receipt of downstream-directed packets along its primary forward port. Assuming downstream-directed packets are received along the primary forward port, the telemetry unit 402 forwards the open path packets received along all aft ports. In the example system of FIG. 4 then, the telemetry unit 402 forwards the downstream-directed packets to the primary forward port of the telemetry unit 404 (along primary communication channel 416), and also forwards the downstream-directed packets to the alternate forward port of telemetry unit 406 (along secondary communication channel 422). In the case where the downstream-directed packets are time synchronization packets (and thus contain time synchronization information), the telemetry unit 402 also checks alignment of its internal clock, and aligns the clock as needed, to the time synchronization information. If at any time the example telemetry unit 402 senses that arrival of downstream-directed packets have ceased on the primary forward port (or otherwise decides to switch the active forward port), responsive thereto the telemetry unit 402 attempts to sense downstream-directed packets on the one or more alternate forward port(s). If the example telemetry unit senses open path packets on the alternate forward port (with or without time synchronization information), then the example telemetry unit 402 sends the downstream-directed packets received on the alternate forward port along all aft ports. Stated in terms of communication channels, if the downstream-directed packets fail to arrive across the primary communication channel 412, downstream-directed packets received across the secondary communication channel 414 (here, from the computer system 401 on the tow vessel 102 or at the head end of an ocean bottom cable) are forwarded along all the aft ports.

Likewise telemetry unit 404 is designed and constructed to initially attempt to sense receipt of downstream-directed packets along its primary forward port. Assuming downstream-directed packets are received along the primary forward port, the telemetry unit 404 relays the open path packets along all aft ports. In the example system of FIG. 4 then, the telemetry unit 404 relays the downstream-directed packets to the primary forward port of the telemetry unit 406 (along primary communication channel 420), and also forwards the downstream-directed packets to the alternate forward port of next downstream telemetry unit (along secondary communication channel 436). In the case where the downstream-directed packets are time synchronization packets (and thus contain time synchronization information), the telemetry unit 404 also checks alignment an internal clock, and aligns the clock as needed, to the time synchronization information. If at any time the example telemetry unit 404 senses that arrival of downstream-directed packets has ceased on the primary forward port (or otherwise decides to switch the active forward port), responsive thereto the telemetry unit 404 attempts to sense downstream-directed packets on the one or more alternate forward port(s). If the example telemetry 404 unit senses downstream-directed packets on the alternate forward port (with or without time synchronization information), then the example telemetry unit 404 relays the downstream-directed packets received on the alternate forward port along all aft ports. Stated in terms of communication channels, if the downstream-directed packets fail to arrive across the primary communication channel 416, downstream-directed packets received across the secondary communication channel 418 are relayed along all the aft ports.

Thus, the pattern of relaying downstream-directed packets along primary or secondary communication channels repeats for each telemetry unit along the geophysical sensor streamer 106 or ocean bottom cable. Telemetry unit 408 has only one connected aft port, and thus regardless of across which forward port downstream-directed packets are received, the telemetry unit relays the downstream-directed packets only to the distal-most telemetry unit 410. The distal-most telemetry unit 410 has no downstream connections to its aft ports, and thus does not relay downstream-directed packets.

The discussion to this point has been concerned only with downstream-directed packets, and how those downstream-directed packets are relayed by the telemetry units along the chain of telemetry units of the geophysical sensor streamer or ocean bottom cable. The specification now turns to geophysical or sensor data collected from the sensors, and how the sensor data is gathered and forwarded along the chain of telemetry units to the computer system in the tow vessel 102 or head end of the ocean bottom cable.

Still referring to FIG. 4, and considering the distal-most telemetry unit 410. Example telemetry unit 410 gathers sensor data packets from one or more digitizers (see, e.g., FIG. 3). The example telemetry unit 410 then sends the sensor data packets out of the single, active forward port along the active communication channel. Assuming the primary communication channel 428 is active, the telemetry unit 410 sends the sensor data packets only out of the primary forward port along the primary communication channel 428. If the secondary communication channel 430 is active, the telemetry unit 410 sends the sensor data packets only out of the alternate forward port along the secondary communication channel 430, bypassing telemetry unit 408.

Still with respect to forward propagating sensor data packets, and now considering telemetry unit 408. Example telemetry unit 408 gathers sensor data packets from one or more digitizers (see, e.g., FIG. 3). The example telemetry unit 408 then sends the sensor data packets out of the single, active forward port. Assuming the primary communication channel 424 is active, the telemetry unit 424 sends the sensor data packets only out of the primary forward port along the primary communication channel 424. If the secondary communication channel 426 is active, the telemetry unit 408 sends the sensor data packets only out of the alternate forward port along the secondary communication channel 426, bypassing next forward telemetry unit (not shown).

Telemetry unit 408 may also receive sensor data packets at one of its aft ports from telemetry unit 410. In example embodiments, telemetry units forward any sensor data packets received on any aft port along a single, active forward port (i.e., the same forward port out which sensor data packets created within the telemetry unit are sent). Thus, in the example system of FIG. 4 telemetry unit receives sensor data packets from telemetry unit 410 along primary communication channel 428, and forwards the sensor data packets along a single, active forward port.

Still referring to FIG. 4, and like the previous telemetry units, example telemetry unit 404 gathers sensor data packets from one or more digitizers (see, e.g., FIG. 3). The example telemetry unit 404 then sends the sensor data packets out of the single, active forward port along the active communication channel. Assuming the primary communication channel 416 is active, the telemetry unit 404 sends the sensor data packets only out of the primary forward port along the primary communication channel 416. If the secondary communication channel 418 is active, the telemetry unit 404 sends the sensor data packets only out of the alternate forward port along the secondary communication channel 418, bypassing telemetry unit 402.

Telemetry unit 404 may receive sensor data packets sourced at downstream telemetry units by way of its aft ports. In particular, telemetry unit 404 may receive sensor data packets from telemetry unit 406 along primary communication channel 420, and may also receive sensor data packets from the second downstream nearest-neighbor telemetry unit (not shown) along secondary communication channel 436. In example embodiments, telemetry units forward any sensor data packets received on any aft port along a single, active forward port (i.e., the same forward port out of which sensor data packets created within the telemetry unit are sent). Thus, sensor data packets received from downstream telemetry units are forwarded toward the computer system 401 on the tow vessel 102 or the head end of the ocean bottom cable by each telemetry unit in the chain.

Like the previous telemetry units, example telemetry unit 402 gathers sensor data packets from one or more digitizers (see, e.g., FIG. 3). The example telemetry unit 402 then sends the sensor data packets along a single, active forward port. Assuming the primary communication channel 412 is active, the telemetry unit 402 sends the sensor data packets only out of the primary forward port along the primary communication channel 412. If the secondary communication channel 414 is active, the telemetry unit 402 sends the sensor data packets only out of the alternate forward port along the secondary communication channel 414, bypassing telemetry unit 400, and in this case the sending directly to the computer system 401 on the tow vessel 102 of the head end of the ocean bottom cable.

Telemetry unit 402 may receive sensor data packets from downstream telemetry units by way of its aft ports. In particular, telemetry unit 402 may receive sensor data packets from telemetry unit 404 along primary communication channel 416, and may also receive sensor data packets from the telemetry unit 406 along secondary communication channel 422. As before, telemetry unit 402 forwards any sensor data packets received on any aft port along a single, active forward port.

Like the previous telemetry units, example telemetry unit 400 gathers sensor data packets from one or more digitizers (see, e.g., FIG. 3). The example telemetry unit 400 then sends the sensor data packets along a single, active forward port. Assuming the primary communication channel 432 is active, the telemetry unit 400 sends the sensor data packets out of the primary forward port along the primary communication channel 432 directly to the computer system 401 aboard the tow vessel 102. If the secondary communication channel 434 is active, the telemetry unit 400 sends the sensor data packets only out of the alternate forward port along the secondary communication channel 434 directly to the computer system 401 on the tow vessel 102.

Telemetry unit 400 may receive sensor data packets from downstream telemetry units by way of its aft ports. In particular, telemetry unit 400 may receive sensor data packets from telemetry unit 402 along primary communication channel 412, and may also receive sensor data packets from the telemetry unit 404 along secondary communication channel 418. As before, telemetry unit 400 forwards any sensor data packets received on any aft port along a single, active forward port.

In the preceding discussion, telemetry unit 406 was skipped owing to the fact one or more telemetry units downstream from telemetry unit 406 are omitted from FIG. 4 so as not to further complicate the drawing. Nevertheless, telemetry unit 404 gathers sensor data packets, and sends sensor data packets along a single, active forward port as described with respect to the other telemetry units. Moreover, telemetry unit 406 receives sensor data packets on its aft ports, and forwards the sensor data packets along a single, active forward port.

It can be seen by the foregoing description that, in example embodiments, data communications redundancy is achieved autonomously within the streamer or ocean bottom cable itself, by virtue of the behavior and interconnection of the telemetry units themselves. Thus, a computer system on the tow vessel, or at the head end of the ocean bottom cable, need not intervene in order to overcome a faulty communication channel somewhere within the (possibly kilometers long) sensor cable.

Figure 7:
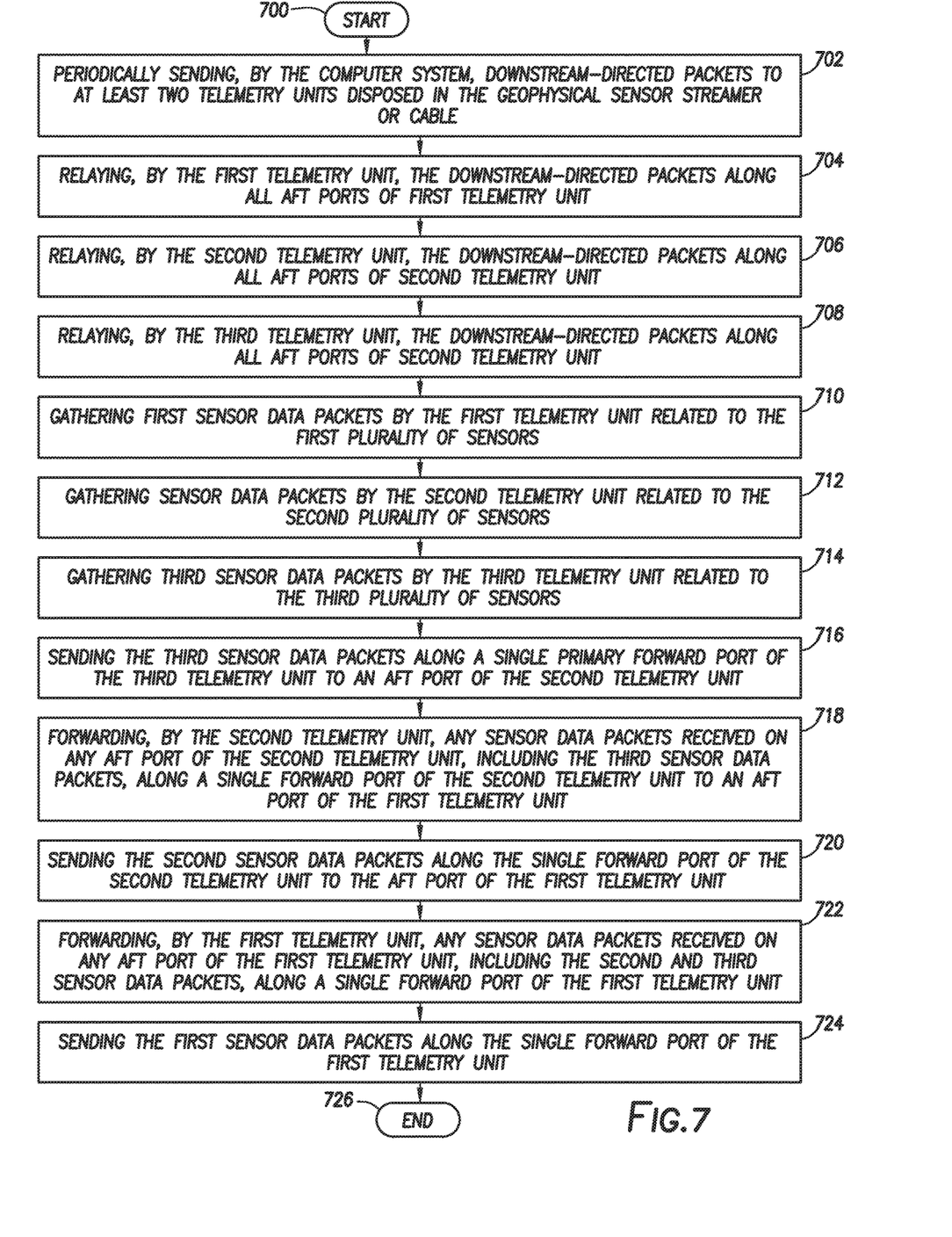
FIG. 7 shows an additional method in accordance with at least some embodiments.

FIG. 7 shows a further method in accordance with at least some embodiments. In particular, in reference to a system such as shown in FIG. 4, the method starts (block 700) and comprises: periodically sending, by the computer system, downstream-directed packets to at least two telemetry units disposed in the geophysical sensor streamer or cable (block 702); relaying, by the first telemetry unit, the downstream-directed packets along all aft ports of first telemetry unit (block 704); relaying, by the second telemetry unit, the downstream-directed packets along all aft ports of second telemetry unit (block 706); relaying, by the third telemetry unit, the downstream-directed packets along all aft ports of second telemetry unit (block 708); gathering first sensor data packets by the first telemetry unit related to the first plurality of sensors (block 710); gathering second sensor data packets by the second telemetry unit related to the second plurality of sensors (block 712); gathering third sensor data packets by the third telemetry unit related to the third plurality of sensors (block 714); sending the third sensor data packets along a single primary forward port of the third telemetry unit to an aft port of the second telemetry unit (block 716); forwarding, by the second telemetry unit, any sensor data packets received on any aft port of the second telemetry unit, including the third sensor data packets, along a single forward port of the second telemetry unit to an aft port of the first telemetry unit (block 718); sending the second sensor data packets along the single forward port of the second telemetry unit to the aft port of the first telemetry unit (block 720); forwarding, by the first telemetry unit, any sensor data packets received on any aft port of the first telemetry unit, including the second and third sensor data packets, along a single forward port of the first telemetry unit (block 722); and sending the first sensor data packets along the single forward port of the first telemetry unit (block 724). Thereafter the method ends (block 726), likely to be immediately repeated.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A geophysical sensor cable section, comprising:
    a first coupler with a first communication connector therein, the first coupler disposed at a first end of the geophysical sensor cable section and configured to mechanically and communicatively couple to a mating coupler of an upstream geophysical sensor cable section;
    a second coupler with a second communication connector therein, the second coupler disposed at a second end of the geophysical sensor cable section opposite the first end and configured to mechanically and communicatively couple to a mating coupler of a downstream geophysical sensor cable section;
    an outer surface extending from the first to the second coupler and defining an internal volume;
    a plurality of geophysical sensors disposed at spaced apart locations within the internal volume;
    a digitizer disposed within the internal volume and communicatively coupled to the plurality of geophysical sensors; and
    a telemetry unit disposed within the internal volume and communicatively coupled to the digitizer, the telemetry unit comprising:
        primary and secondary forward ports coupled to the first communication connector;
        first and second aft ports coupled to the second communication connector; and
        a controller communicatively coupled to the forward ports, the aft ports, and the digitizer;
    wherein the controller is configured to:
        designate one of the primary and secondary forward ports as an active forward port;
        gather sensor data from the digitizer and send the sensor data as an upstream-directed packet through the active forward port;
        relay downstream-directed packets received on the active forward port through the first aft port;
        relay the downstream-directed packet received on the active forward port through the second aft port; and
        relay upstream-directed packets received on the first and second aft ports through the active forward port.

2. The geophysical sensor cable section of claim 1, wherein the controller is configured to designate only one of the primary and secondary forward ports as the active forward port at any one time.

3. The geophysical sensor cable section of claim 1, wherein:
    the telemetry unit comprises only one set of send and receive circuits associated with the primary and secondary forward ports; and
    the controller is configured to selectively couple the one set of send and receive circuits to the active forward port.

4. The geophysical sensor cable section of claim 1, wherein the controller is configured to change the designation of the active forward port responsive to a fault determination.

5. The geophysical sensor cable section of claim 4, wherein the fault determination is based on a failure to receive a downstream-directed packet on the active forward port within a predetermined period of time.

6. The geophysical sensor cable section of claim 4, wherein the fault determination is based on signal strength sensed on a communication line coupled to the active forward port.

7. The geophysical sensor cable section of claim 1, wherein the controller is configured to:
    determine that a downstream-directed packet received on the active forward port is a time synchronization packet; and
    align an internal clock within the telemetry unit responsive to information contained in the time synchronization packet.

8. The geophysical sensor cable section of claim 1, wherein the controller is configured to:
    determine that a downstream-directed packet received on the active forward port is a control packet addressed to the telemetry unit only;
    modify a control state within the telemetry unit responsive to information contained in the control packet; and
    not relay the control packet through either of the first and second aft ports.

9. The geophysical sensor cable section of claim 1, wherein the controller is configured to:
  determine that a downstream-directed packet received on the active forward port is a control packet addressed to a plurality of telemetry units;
  modify a control state within the telemetry unit responsive to information contained in the control packet; and
  relay the control packet through both of the first and second aft ports.

10. The geophysical sensor cable section of claim 1, wherein the coupling of the primary and secondary forward ports to the first communication connector is through one or more additional telemetry units.

11. The geophysical sensor cable section of claim 1, wherein the coupling of the first and second aft ports to the second communication connector is through one or more additional telemetry units.

12. The geophysical sensor cable section of claim 1, wherein:
  the primary forward port is coupled to an aft port of a first additional telemetry unit;
  the secondary forward port is coupled to an aft port of a second additional telemetry unit;
  the first aft port is coupled to a forward port of a third additional telemetry unit; and
  the second aft port is coupled to a forward port of a fourth additional telemetry unit.

13. The geophysical sensor cable section of claim 1, wherein at least some of the downstream-directed packets are relayed using a connectionless protocol.

14. The geophysical sensor cable section of claim 13, wherein the connectionless protocol is UDP.

15. The geophysical sensor cable section of claim 1, wherein at least some of the upstream-directed packets are relayed using a connection-oriented protocol.

16. The geophysical sensor cable section of claim 15 wherein the connection-oriented protocol is TCP.

17. The geophysical sensor cable section of claim 1, wherein the geophysical sensor cable section is configured to be part of a towed streamer.

18. The geophysical sensor cable section of claim 1, wherein the geophysical sensor cable section is configured to be part of an ocean bottom cable.

19. The geophysical sensor cable section of claim 1, wherein the digitizer and the telemetry unit are integrated as one unit.

20. The geophysical sensor cable section of claim 1, wherein the digitizer and the telemetry unit are implemented as discrete units.

21. A method comprising:
  periodically sending, by a computer system coupled to a geophysical sensor cable, downstream-directed packets to at least two telemetry units disposed in the geophysical sensor cable;
  relaying, by a first telemetry unit comprising aft ports, the downstream-directed packets along all the aft ports of the first telemetry unit;
  relaying, by a second telemetry unit comprising aft ports, the downstream-directed packets along all the aft ports of the second telemetry unit;
  relaying, by a third telemetry unit comprising aft ports, the downstream-directed packets along all the aft ports of the third telemetry unit;
  gathering first sensor data packets by the first telemetry unit based on a first plurality of sensors;
  gathering second sensor data packets by the second telemetry unit based on a second plurality of sensors;
  gathering third sensor data packets by the third telemetry unit based on a third plurality of sensors;
  sending the third sensor data packets along a single forward port of the third telemetry unit to an aft port of the second telemetry unit;
  forwarding, by the second telemetry unit, any sensor data packets received on any aft port of the second telemetry unit, including the third sensor data packets, along a single forward port of the second telemetry unit to an aft port of the first telemetry unit;
  sending the second sensor data packets along the single forward port of the second telemetry unit to the aft port of the first telemetry unit;
  forwarding, by the first telemetry unit, any sensor data packets received on any aft port of the first telemetry unit, including the second and third sensor data packets, along a single forward port of the first telemetry unit; and
  sending the first sensor data packets along the single forward port of the first telemetry unit.

22. The method of claim 21 further comprising:
  gathering fourth sensor data packets by the third telemetry unit based on the third plurality of sensors;
  sensing, by the third telemetry unit, that arrival of downstream-directed packets have ceased on the forward port of the third telemetry unit; and responsive thereto
  sending the fourth sensor data packets along a single alternate forward port of the third telemetry unit to an aft port of the first telemetry unit.

23. The method of claim 22 wherein, prior to sending the fourth sensor data packets, the method further comprises:
  receiving a downstream-directed packet comprising time synchronization information over the alternate forward port of the third telemetry unit; and
  utilizing the time synchronization information received over the alternate forward port to align a time reference within the third telemetry unit.

24. The method of claim 21 further comprising:
  gathering fifth sensor data packets by the second telemetry unit based on the second plurality of sensors;
  sensing, by the second telemetry unit, that arrival of downstream-directed packets have ceased on the forward port of the second telemetry unit; and
  responsive thereto sending the fifth sensor data packets directly to the computer system.

25. The method of claim 21:
  wherein forwarding by the first telemetry unit further comprises at least one selected from a group consisting of: forwarding to the computer system; and forwarding to a telemetry unit closer to the computer system; and
  wherein sending the first sensor data packets from the first telemetry unit further comprises at least one selected from a group consisting of: sending to the computer system; and sending to a telemetry unit closer to the computer system.

26. The method of claim 21 wherein periodically sending downstream-directed packets further comprises sending to forward ports of at least the first and second telemetry units.

27. The method of claim 26 wherein periodically sending downstream-directed packets further comprises periodically sending downstream-directed packets to the first, second, and third telemetry units.

28. The method of claim 21:
  wherein relaying, by the first telemetry unit, the downstream-directed packets further comprises sending to the forward port of the second telemetry unit, and sending to the an alternate forward port of the third telemetry unit at a third distance along the geophysical sensor cable;
wherein relaying, by the second telemetry unit, the downstream-directed packets further comprises sending to the forward port of the third telemetry unit, and sending to an alternate forward port of a fourth telemetry unit disposed at a fourth distance along the geophysical sensor cable greater than the third distance;
wherein relaying, by the third telemetry unit, the downstream-directed packets further comprises sending to a forward port of the fourth telemetry unit, and sending to an alternate forward port of a fifth telemetry unit disposed at a fifth distance along the geophysical sensor cable greater than the fourth distance.

29. The method of claim 21:
wherein relaying, by the first telemetry unit, the downstream-directed packets further comprises sending to the forward port of the second telemetry unit, sending to an alternate forward port of the third telemetry unit at a third distance along the geophysical sensor cable, and sending to an alternate forward port of a fourth telemetry unit disposed at a fourth distance along the geophysical sensor cable greater than the third distance;
wherein relaying, by the second telemetry unit, the downstream-directed packets further comprises sending to the forward port of the third telemetry unit, sending to the alternate forward port of the fourth telemetry unit, and sending to an alternate forward port of a fifth telemetry unit disposed at a fifth distance along the geophysical sensor cable greater than the fourth distance;
wherein relaying, by the third telemetry unit, the downstream-directed packets further comprises sending to a forward port of the fourth telemetry unit, sending to an alternate forward port of the fifth telemetry unit, and sending to an alternate forward port of a sixth telemetry unit disposed at a sixth distance along the geophysical sensor cable greater than the fifth distance.

\* \* \* \* \*